(No Model.)

T. A. WALTHER & M. F. BARRETT.
WATER FAUCET.

No. 539,714. Patented May 21, 1895.

Witnesses:
R. J. Jacker
Floral L. Brown

Inventors:
Theodore A. Walther and
Michael F. Barrett,
By Charles Turner Brown
Atty.

UNITED STATES PATENT OFFICE.

THEODORE A. WALTHER AND MICHAEL F. BARRETT, OF CHICAGO, ILLINOIS.

WATER-FAUCET.

SPECIFICATION forming part of Letters Patent No. 539,714, dated May 21, 1895.

Application filed August 6, 1894. Serial No. 519,615. (No model.)

*To all whom it may concern:*

Be it known that we, THEODORE A. WALTHER and MICHAEL F. BARRETT, residents of Chicago, in the county of Cook and State of Illinois, have invented certain new and useful Improvements in Water-Faucets, of which the following, when taken in connection with the drawings accompanying and forming a part hereof, is a full and complete description, sufficient to enable those skilled in the art to which it appertains to understand, make, and use the same.

Our invention relates to the kind in which a rubber valve is forcibly brought up to and against its seat by the turning of the handle of the faucet, and is there held so long as no water is to be drawn from the faucet; and the object of our invention is to obtain means whereby when the pipes to which the faucet is attached are emptied of water there shall be no necessity of so turning the handle of the faucet as to force the valve from off its seat to permit air to enter the pipes to replace such water. In other words we desire to obtain means for automatically venting the service pipes to which valves of the character named are attached.

Figure 1:
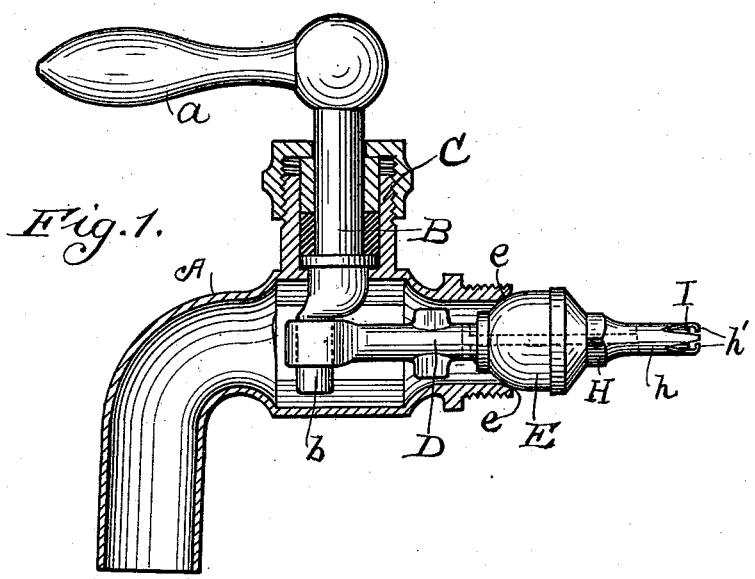
Figure 2:
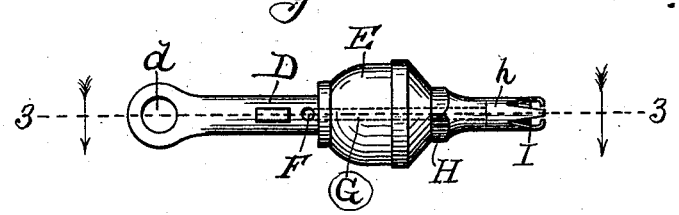
Figure 3:
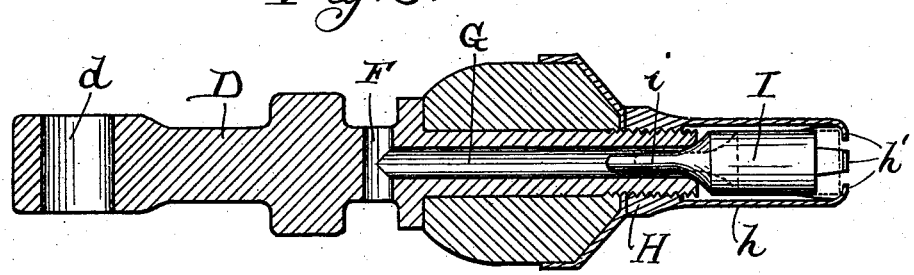

The particular valve which we seek to improve in the manner stated is well illustrated in the drawings in Figures 1 and 2 thereof, Fig. 1 being a longitudinal sectional view of the valve improved by us; Fig. 2, a top plan view of the plug and valve thereof; and Fig. 3, a longitudinal sectional view of such plug, on an enlarged scale, on line 3 3 of Fig. 2, viewed in the direction indicated by the arrows.

The same letter of reference is applied to a part where more than one view thereof is shown in the different figures of the drawings.

A is the casing of the faucet.

*a* is the handle of the faucet.

B is a rotatable spindle, having the crank arm *b* at the lower end thereof, and having handle *a* attached thereto at the upper end thereof.

C is a stuffing box.

D is a plug having hole *d* at one end thereof. Crank *b* fits loosely in hole *d*, so that rotation of the handle *a* and spindle B produces longitudinal movement of plug D.

E is a rubber valve secured on plug D.

*e* is the valve seat of rubber valve E.

The several parts of the valve as above described are old and well known in the art.

F is a hole through plug D, and G is a hole extending longitudinally from one end of the plug D thereinto and to hole F.

H is a nut fitting on the plug D and adapted to hold the rubber valve E in place on the plug.

*h* is an extension of the nut H, forming a tube and *h'*, *h'* are teeth at the end of such tube *h*.

I is a valve, preferably constructed of soft rubber, fitting loosely in the cylinder *h*, and adapted at the small end thereof, (lettered *i*,) to fit into and close the hole G, when pressure is applied to the back thereof, as by the presence of water in the service pipes to which the faucet is attached. The rubber valve I is adapted to move longitudinally in the cylinder *h*, and when moved back away from plug D the hole G is opened so that air may pass back through the plug (by way of holes F and G), into the service pipes to which the plug is attached.

By this construction we have found it possible to construct a faucet of the kind which will automatically vent the service pipes when the water contained therein is allowed to flow to waste; while at the same time we have found that no leakage of water through the faucet will occur.

We do not claim the construction of the faucet, so far as the same is old and well known in the art as above set out; but What we do claim, and desire to secure by Letters Patent, is—

1. In a faucet, having a rotatable spindle, a handle on the outer end thereof and a crank arm on the inner end, the combination therewith of a plug attached to the crank arm, such plug having a valve on the outside thereof and a hole extending from the inner end to in front of the valve, a nut securing the valve on the plug in place, a cylinder on the nut, and a rubber valve in the cylinder, longitudinally movable and adapted to be seated on the inner end of the plug and close the hole therein, or to be moved off from such inner end of the plug and open such hole; substantially as described.

2. In a faucet, the combination of a plug, having a valve on the outside thereof and a hole extending from the inner end to in front of the valve, a nut securing the valve on the plug in place, a cylinder on the nut, and a rubber valve in the cylinder, longitudinally movable and adapted to be seated on the inner end of the plug and close the hole therein, or to be moved off from such inner end of the plug and open such hole, with means for moving the plug longitudinally; substantially as described.

THEODORE A. WALTHER.
MICHAEL F. BARRETT.

In presence of—
CHARLES TURNER BROWN,
FLORA L. BROWN.